No. 752,262. PATENTED FEB. 16, 1904.
W. ROBINSON.
BRAKING AND CLUTCHING MECHANISM.
APPLICATION FILED MAY 5, 1898.
NO MODEL. 3 SHEETS—SHEET 1.
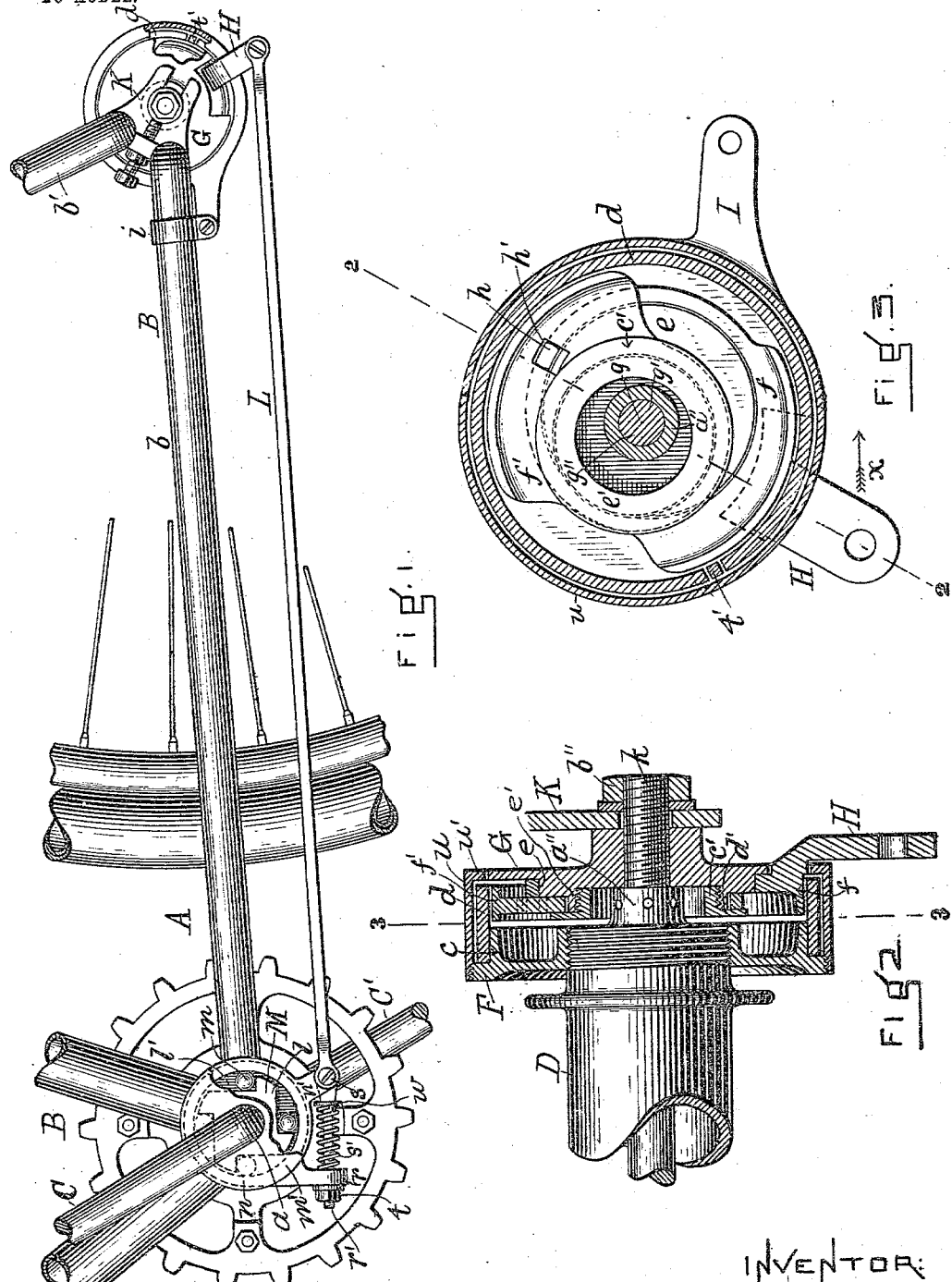

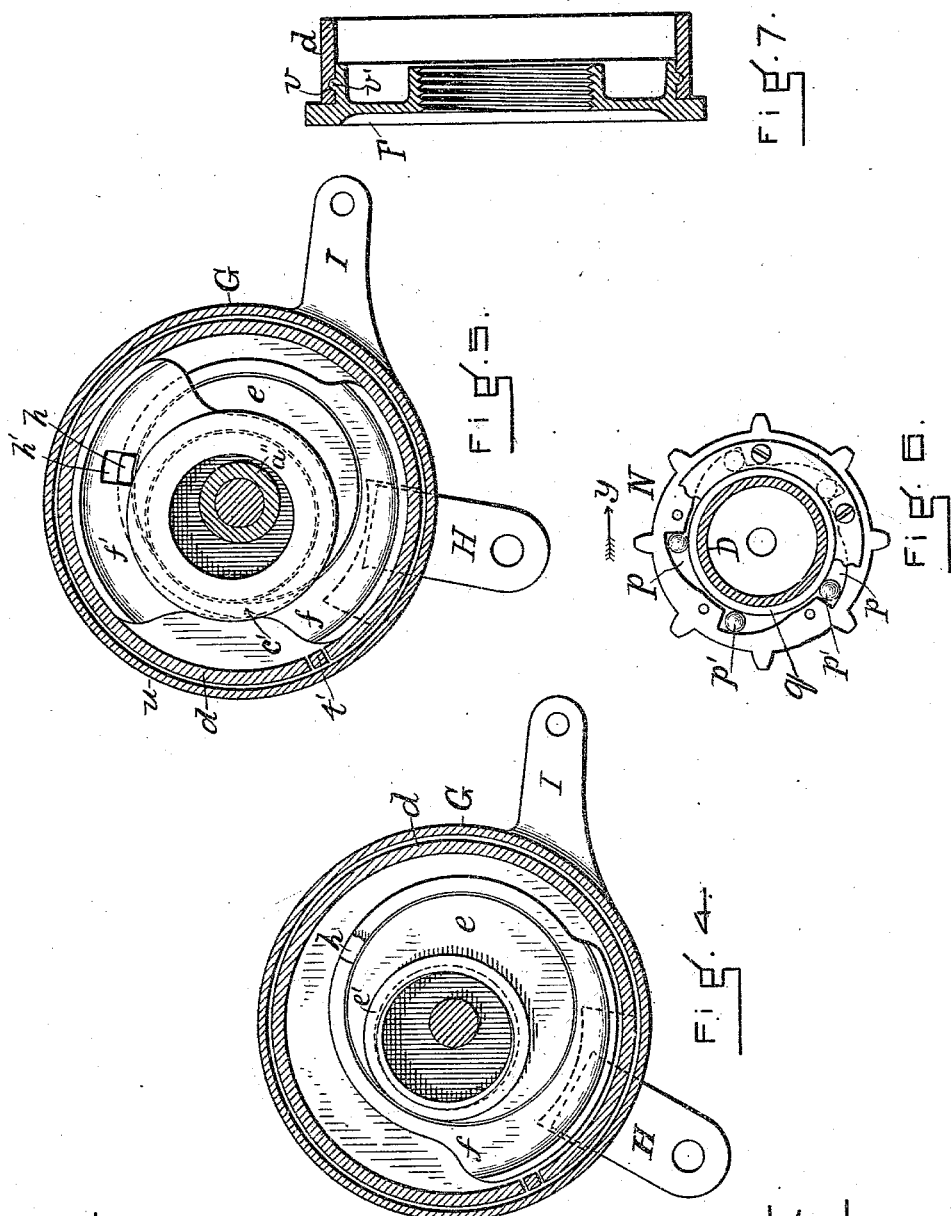

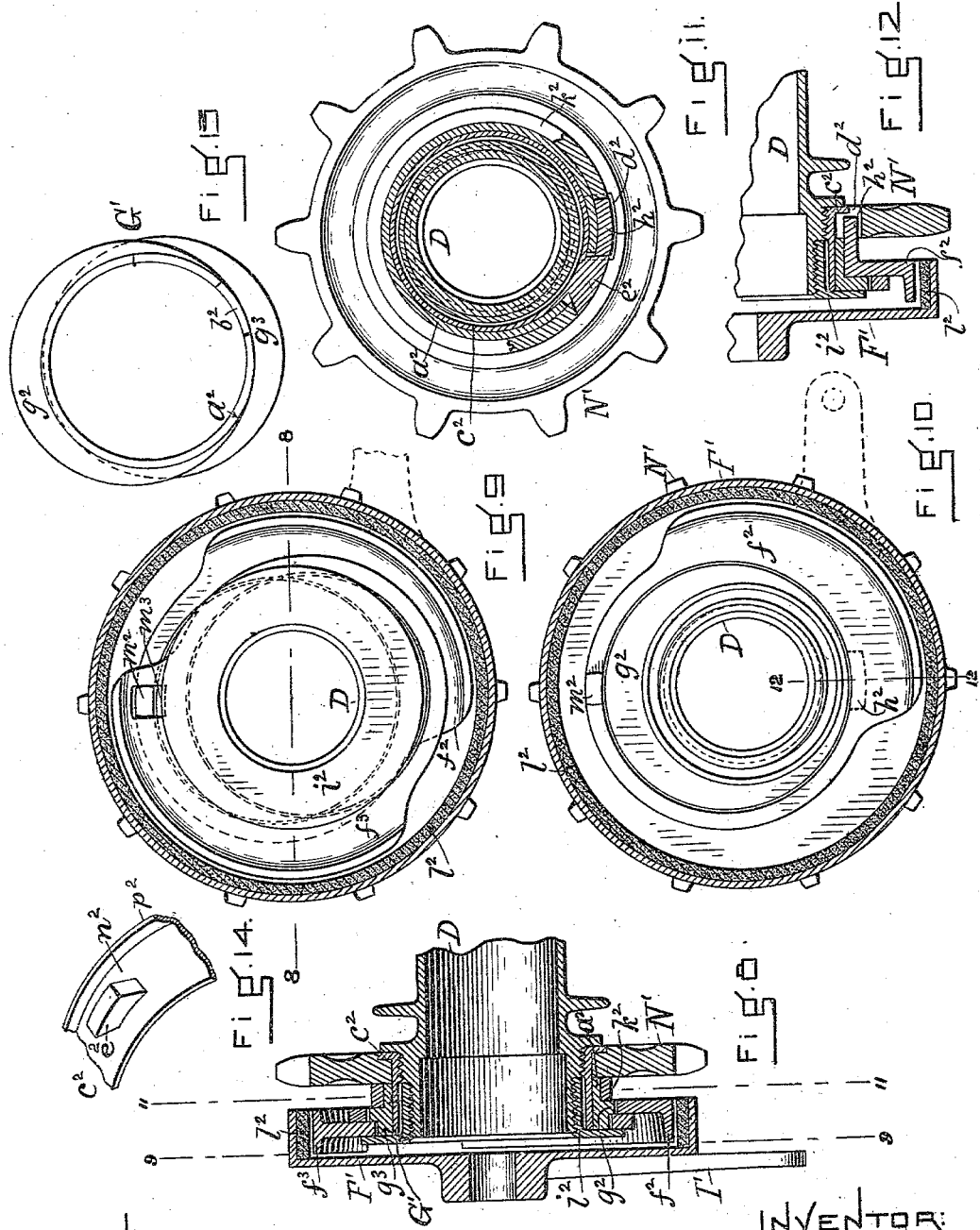

No. 752,262. Patented February 16, 1904.

UNITED STATES PATENT OFFICE.

WILLIAM ROBINSON, OF BOSTON, MASSACHUSETTS.

BRAKING AND CLUTCHING MECHANISM.

SPECIFICATION forming part of Letters Patent No. 752,262, dated February 16, 1904.

Application filed May 5, 1898. Serial No. 679,811. (No model.)

*To all whom it may concern:*

Be it known that I, WILLIAM ROBINSON, a citizen of the United States, residing in Boston, in the county of Suffolk and State of Massachusetts, have invented a new and Improved Braking and Clutching Mechanism, of which the following is a specification as applied to bicycles.

The nature of my invention will be clearly understood from the description which follows, reference being had to the accompanying drawings, which form a part of this specification, in which—

Figure 1 is a side elevation of a portion of a bicycle, showing one application of my invention thereto for braking purposes. Fig. 2 shows a section of the brake mechanism as applied in Fig. 1, taken through the line 2 2, Fig. 3. Fig. 3 is a section of the same through the line 3 3, Fig. 2. Figs. 2 and 3 show the brake released. Fig. 4 is similar to Fig. 3, but with some of the parts removed for clearness of illustration. Fig. 5 is the same as Fig. 3, but showing the brake as applied to control or stop the machine. Fig. 6 is a cross-section of the rear hub, showing means for clutching the rear sprocket to the hub; and Fig. 7 is a section showing alternative means of securing the spring-drum in position on its seat. Fig. 8 is a longitudinal section of the rear or driving hub, showing the application of my brake mechanism thereto when operated by the reverse movement of the chain. This section is through the line 8 8, Fig. 9. Fig. 9 is a section through the line 9 9, Fig. 8; and Fig. 10 is the same as Fig. 9, but with some of the working parts removed for clearness of illustration. Fig. 11 is a section through the line 11 11, Fig. 8. Fig. 12 is a section through the line 12 12, Fig. 10. Fig. 13 is a detail of the double eccentric segment as used in Figs. 8 to 12, inclusive; and Fig. 14 is a detail of the gear-sleeve.

A represents a bicycle having a frame B provided with the crank C C', connected by the crank-shaft $a$ and mounted in the crank-bracket in any usual or suitable manner. The rear hub D of the driving-wheel is also mounted in the frame B between fork sides $b$ $b'$ in the usual manner.

The upper portions of the bicycle-frame and certain other portions are omitted for the purpose of permitting a clearer illustration of the working parts.

Referring to Figs. 1 to 5, inclusive, the rear-wheel hub D is provided with the drum-seat F, which is provided with the annular flange $c$. The stiff spring $d$ is mounted on this flange $c$, clasping the same tightly. The said spring $d$ is wider than the flange $c$ and projects outwardly beyond the same. The base-plate G is provided with the two eccentric rings or projections $e$ $e'$, which eccentrics project in opposite directions from the center $g$ of the plate G. The movable eccentric segment $f$ encircles the eccentric $e$, while the movable eccentric segment $f'$ encircles the eccentric ring $e'$. The eccentrics $e$ and $e'$ are in different but adjacent planes. The orifices of the eccentric segments $f$ $f'$ are struck from points eccentric to the axial center $g$ of the plate G—that is, while the peripheries of said eccentric segments $f$ $f'$ are struck from the center $g$ of said plate G the orifice of the segment $f$ is struck from the center $g'$, which is, say, one-eighth of an inch or more to one side of the center $g$, while the center of the orifice of the segment $f'$ is struck from the center $g''$, which is a similar distance on the opposite side of the center $g$ of the plate G. The centers of the orifices of said segments coincide, respectively, with the centers of the eccentrics $e$ $e'$. The segments $f$ $f'$ are kept in proper relative position by the locking-ring $c'$, screwed into the plate G and provided with the flange $d'$, which overlaps said segments $f$ $f'$, as shown.

Inspection will show that the segments $f$ $f'$ are wider at one end than the other—that is, are wedge-shaped with curving surfaces. Consequently when moved forward into the narrower space between their respective eccentric seats and the inner periphery of the drum $d$ they form a wedging frictional contact between said surfaces, thus making a most effective brake or clutch.

The eccentric segment $f$ is provided with the projection H and also with the rectangular projection or lug $h$, which latter engages the orifice $h'$ in the segment $f'$. Thus when the projection H is drawn in the direction of the arrow $x$ the periphery of the segment $f$ is brought in contact with the drum-spring $d$, while the movement of the segment $f$ also moves the segment $f'$ through said projection $h$ in the orifice $h'$, thus bringing the periphery of said segment $f'$ also in contact with the inner peripheral surface of the drum-spring $d$—that is, the drawing of the projection H in the direction of said arrow moves the eccentric segments $f$ $f'$ into frictional contact with the inner periphery of the drum $d$, the friction being in proportion to the force applied to the projection H.

The base-plate G is provided with the lug or projection I, which is secured to the lower fork side $b$ by the strap $i$, as shown in Fig. 1. This connection holds the base-plate G from turning. The base-plate G is held firmly in position on the axle $k$ against the fork K by the cone $a''$ on one side and the nut $b''$ on the other.

In the crank-clutch M the clutch-center $l$, provided on its periphery with the recesses $l'$, is rigidly secured to the crank-shaft $a$, with said recesses $l'$ opening or tapering forward with reference to the forward revolution of said crank-shaft $a$. The recesses $l'$ taper or are wider at one end than the other, as is evident from inspection. The balls or rollers $m$ are inserted between the clutch center piece $l$ and the clutch-ring $m'$, as clearly shown in Fig. 1. The side plates $n$ inclose the balls $m$ $m$ and keep the clutch-center $l$ and the clutch-ring $m'$ in proper vertical alinement.

The projection or lug H of the brake mechanism is pivotally connected to the lug $n'$ of the clutch-ring $m'$ by the connecting-rod L, as shown. The brake mechanism is in this case operated by actually reversing the cranks C C', and in order to reverse these cranks it is necessary when the wheel is in motion to disconnect the rear or driving wheel from engagement with the driving mechanism. This is done by the clutch arrangement shown in Fig. 6, in which the rear sprocket N is provided on its inner peripheral surface with the curving or wedge-shaped recesses $p$, and within these recesses are inserted the balls or rollers $p'$, having a bearing between the inner wedge-shaped surfaces of these recesses and the plain periphery of the ring $q$, which is rigidly secured to the hub D. It is evident then that when the sprocket N is driven forward in the direction of the arrow $y$—that is, when the wheel is being driven forward—the rollers $p'$ wedge in the recesses $p$, thus firmly clutching the sprocket N to the hub D; but as soon as the pedal action ceases the movement of the sprocket N is arrested, while the hub D continues to revolve, carrying the rollers $p'$ to the wide part of the recesses $p$, thus releasing the clutch. In other words, the hub D, with its wheel, coasts, while the rear sprocket, the chain, and the cranks, with their pedals, remain stationary.

The operation of the brake mechanism, therefore, is as follows: It will be understood that in driving the wheel forward the clutch-ring $m'$ is stationary, while the clutch-center $l$, being rigidly secured to the crank-shaft $a$, revolves therewith, carrying the rollers $m$ around with it in the widest part of the recesses $l'$—that is, the clutch M is out of engagement. Assuming, now, that the wheel is being driven forward and it is desired to apply the brake, the first action of the rider is to stop pedaling. This arrests the movement of the chain, the cranks, and the pedals relatively to the revolving wheels. The next movement is to reverse slightly the position of the pedals, carrying them backward. This movement locks the clutch-center $l$ and the clutch-ring $m'$ together, and a little further movement carries the connecting-rod L forward, thus drawing forward the projection or lug H of the brake mechanism, thereby pressing the peripheries of the eccentric segments $f$ $f'$ against the inner surface of the spring-drum $d$ with greater or less force, according to the pressure exerted on the pedals. By this means it is evident that the wheel is brought under complete control and caused to revolve slowly or its motion may be quickly arrested.

The projection or lug $r$ is rigidly secured to the crank-hanger or forms a part thereof, and the rod $r'$, passing through this lug or projection $r$ and through the spring $s'$, is pivotally connected at $s$ to the lug $n'$ of the clutch-ring $m'$. The said spring $s'$ has a bearing against the rigid lug $r$ of the crank-hanger and at its opposite end against the washer $w$ on the rod $r'$, as shown in Fig. 1. The said spring $s'$ therefore answers as a release-spring for the brake. It also serves the purpose of offering resistance to a too-easy application of the brake, thus making it necessary to apply some perceptible force in order to apply the brake. Furthermore, the spring $s'$, being located at the crank end of the connecting-rod L, prevents any undue strain being exerted upon said connecting-rod when dismounting. It will be observed, furthermore, that an adjusting-nut $t$ on the rod $r'$ provides for adjusting the tension of said spring $s'$ and also for adjusting and determining the distance between the peripheries of the eccentric segments $f$ $f'$ and the drum $d$ when the brake is released.

It will be noted that in the clutch M the clutch-center $l$ and the clutch-ring $m'$ have a distinct space between them, so that when the clutching parts are locked together said clutch-center and clutch-ring $m'$ do not touch each other at any point. As a result of this arrangement the disconnecting of the clutching parts is easily accomplished and without any undue exertion, whereas if the said clutch-center and clutch-ring are so made that when clutched together their adjacent surfaces are permitted to make contact at any point then the parts lock together frictionally in such a way as to require considerable exertion to separate them. The sprocket N and its inner ring $q$ have also a distinct space between them, as shown in Fig. 6, in the same manner and for the same purpose as just described in connection with the crank-clutch M.

The drum-spring seat F is provided with the projection $t'$, which comes between the separated ends of the spring-drum $d$, thus preventing the spring $d$ from revolving relatively to the drum-seat F. The object of the expansion-spring $d$, used as a drum, is to ease up to a certain extent the pressure of the eccentric segments $f\, f'$ against the interior surface of said spring, and consequently to prevent the sudden locking of the brake and sliding of the wheel when the extra pressure of dismounting is applied upon the pedal. Nevertheless this drum-spring $d$ may in some cases be dispensed with, and particularly where space is limited I do dispense with it, in which case the drum-seat F is itself made in the form of a drum, the interior of the flange $c$ overlapping the segments $f\, f'$. This arrangement will be clearly understood by inspection of Fig. 8.

In Fig. 2 the drum-spring $d$ is covered by the sheath $u$, which is screwed to the drum-spring seat F, as shown. The sheath $u$ is provided with the annular flange $u'$, which overlaps the edge of the drum-spring $d$ to some extent, thus keeping said spring $d$ in position and preventing it from rubbing against any of the fixed parts of the brake mechanism while the wheel is revolving.

In Fig. 7 the drum-spring $d$ is provided on its inner periphery with the annular recess $v$, while the drum-seat F is provided with a corresponding annular rib $v'$, which fits into said recess $v$ of the spring $d$—that is, the spring $d$ is thus held in proper relative position with reference to the spring-seat F, by which means the sheath $u$ (shown in Fig. 2) is dispensed with. I prefer the arrangement shown in Fig. 7 to that shown in Fig. 2, since the former is simpler and dispenses with some weight.

Fig. 8 and the succeeding figures illustrate the operation of the brake when it is applied by reversing the movement of the chain, or to speak more accurately, the sprocket N' is arranged to move backward slightly upon the rear hub with reference to the forward movement of the wheel, and this backward movement of the sprocket applies the brake, as will be clearly understood from these figures and the description. In this case the drum F is stationary and is held rigidly in position with reference to the frame by the projection or lug I', said lug being secured to the lower fork side $b$ by the strap $i$ in the manner already described in connection with Figs. 1 and 3. The remaining parts of the brake are mounted on the hub D and revolve therewith. The double eccentric base G' is provided with the central annular flange $a^2$, and this flange is partly cut away or recessed at one point, as shown $b^2$. The gear-sleeve $c^2$ forms a seat for the sprocket N', which latter is provided on its inner periphery with the recess $d^2$. The said gear-sleeve $c^2$ has a projection $e^2$ extending above its peripheral surface.

In assembling the brake parts the gear-sleeve $c^2$ is preferably first screwed into place on the hub D. The sprocket N' is then slipped over the projection $e^2$ of the gear-sleeve and turned around somewhat, as shown in Fig. 11, the said sprocket finding lodgment in the groove $n^2$ between the flange $p^2$ and the said projection $e^2$ of the gear-sleeve $c^2$. (Shown in Fig. 14.) The eccentric segment $f^2$ is now slipped into position encircling the eccentric $g^2$ and is followed by the spring $k^2$, which firmly clasps the annular flange $a^2$. The double eccentric base G' is then put in position on the gear-sleeve $c^2$, the recessed portion $b^2$ being slipped over the projection $e^2$ of said gear-sleeve and engaging said projection on either side—that is, the projection $e^2$ of said gear-sleeve keeps the double eccentric G' rigidly in position on said gear-sleeve $c^2$. The said eccentric segment $f^2$ is provided with the projection $h^2$, which extends into the recess $d^2$ of the sprocket N', said projection thus engaging said sprocket and controlling the movement of the same. The eccentric segment $f^3$ is next put in place, encircling the eccentric $g^3$, and the locking-ring $i^2$ is now screwed into position, as clearly shown in Figs. 8 to 12. The said locking-ring answers the purpose of holding together the various moving parts connected with the hub. It also serves to lock the gear-sleeve $c^2$ in position when screwed into place upon the hub D. It will be understood that the projection $h^2$ of the eccentric $f^2$ rests against the lug $e^2$ of the gear-sleeve $c^2$ and also enters the recess $d^2$ of the sprocket N', as already described. Hence in forward propulsion power imparted to said sprocket is communicated to said gear-sleeve and thence to the hub through said projection $h^2$. The spring $k^2$ has one end abutting against the projection $e^2$ of the gear-sleeve $c^2$, as clearly shown in Fig. 11. The other end of said spring abuts against the projection $h^2$ of the eccentric segment $f^2$—that is, in applying the brake by back pedaling the said spring $k^2$ is expanded and resists the backward movement of the projection $h^2$ and has a tendency to carry the same into its normal position, as shown in Fig. 11. In other words, it answers the purpose of a release-spring for the brake. The said spring $k^2$ also serves two other purposes—first, as a spacer to determine the distance between the sprocket N' and the brake mechanism, thus insuring sufficient space between the chain and the brake mechanism to prevent the possibility of contact between the two; secondly, said spring answers the purpose of holding the movable parts of the brake mechanism in proper position relatively to each other on the side on which said spring is placed.

A lining $l^2$, of vulcanized fiber, rawhide, or other suitable material, is secured to the inner periphery of the drum F' and forms a bearing against which the eccentric or braking segments $f^2$ and $f^3$ make frictional or braking contact. The said segments are connected together by the projection $m^2$ of the one engaging movably in the recess $m^3$ of the other, whereby said segments are caused to move simultaneously, and to thus simultaneously make frictional contact with the inner periphery of the said drum F'.

It will be understood that back pedaling turns the sprocket N' backward somewhat from its normal position on the hub D, said sprocket carrying with it the projection $h^2$ of the segment $f^2$. This movement turns the segments $f^2$ $f^3$ on their eccentrics $g^2$ $g^3$, thus carrying said segments into frictional contact with the inner periphery of the drum F'—that is, applies the brake with a force proportioned to the force applied in back pedaling. The forward movement of the pedals instantly releases the brake.

The gear-sleeve $c^2$ may form a part of the hub D in manufacturing the same; but it is described here as separated therefrom and screwed upon said hub, the object being in such a case to provide a brake which may be applied to hubs of wheels already manufactured.

It will be observed that a single one of the eccentric-segments $f$ $f'$ shown will make an effective brake. Nevertheless I prefer to use the two together, as described, since this arrangement prevents any irregular pressure on the bearings.

It will be observed that a plurality of braking elements or shoes forced into braking contact with the rotating hub as herein described is a great advantage over the single expansible split brake-ring shown in a former application, for the reason that the whole peripheral braking-surface of said shoes is instantly brought into braking contact with the rotating hub on applying the brake, whereas when the single split ring braking element is used the end pressure brought to bear thereon forces only a part of said ring against the braking-surface of the hub with an irregular pressure, which has an injurious effect on the bearings, and the device is for the above reasons defective in efficiency as a brake. Furthermore, the elastic split ring often loses its elasticity, thus requiring renewal.

It is evident that the brake mechanism herein described may be used in connection with car-trucks and other vehicles as well as bicycles. I do not, therefore, limit its application to bicycles, although it is herein specifically described only in connection with the bicycle. Furthermore, it may be used in controlling the relative speed of concentric shafts of any description where applicable or in clutching and locking the same together and yet be in accord with the substance and spirit of my invention.

I do not herein claim, broadly, a coasting and braking wheel-hub provided at one end with a driver and at the opposite end with a brake, means for clutching the driver and hub together for driving and releasing the same for coasting, and means for actuating said brake by back pedaling, as the same is disclosed in my application filed October 8, 1897, Serial No. 654,532, and in my application filed November 15, 1897, Serial No. 658,638, and I reserve the right to claim the subject-matter of such disclosure in either of my said applications.

Having thus described my invention, what I claim as new, and desire to secure by Letters Patent, is—

1. A coasting-brake mechanism comprising a rotatable wheel-hub having a braking-surface, a stationary brake member supported at one point by the axle and provided with a radial extension connected to the frame of the vehicle, a plurality of non-rotatable movable brake members supported by said stationary member, driving means, means actuated by said driving means on back pedaling for forcing said movable brake members against said braking-surface of the hub, and means for connecting said hub and said driving means on forward pedaling.

2. In a hub-brake, a coasting wheel-hub provided on its inner periphery with a braking-surface, a non-rotatable fixture supported at one point by the axle and provided with a radial extension connected to the frame of the vehicle, a plurality of movable braking elements held in non-rotatable position by said fixture, and means for forcing the outer surfaces of said movable elements against said braking-surface of the hub by back pedaling.

3. In a hub-brake mechanism, the combination with a wheel-hub provided with a braking-surface, of a stationary fixture supported by the axle at one point and provided with a radial extension and a strap for engaging the vehicle-frame at another point, a plurality of braking elements connected non-rotatably to said stationary fixture but having limited movement relatively thereto, and means for bringing said braking elements into frictional braking contact with said braking-surface of the hub by the backward rotation of the crank-shaft.

4. In a coaster-brake mechanism, the combination of a wheel-hub provided with a braking-surface at one side of its center, a driver at the opposite side of said center, a brake mechanism embodying a stationary fixture supported by the axle at one point and provided with an extension projecting radially therefrom for connection with the vehicle-frame at another point, a plurality of braking elements connected non-rotatably to said stationary fixture but having limited movement relatively thereto, and means for forcing said braking elements bodily into braking contact with said braking-surface of the hub by back pedaling.

5. In combination with a coasting-hub provided with a braking-surface, a stationary brake element supported by the wheel-axle at one point and provided with a radial extension arranged to engage the frame of the vehicle at another point, a plurality of movable braking elements held in non-rotatable position by said stationary brake element, but having limited movement relatively thereto, and means for moving said movable braking elements into braking contact with said braking-surface of the hub by back pedaling, said hub overlapping said braking elements.

6. The combination of a stationary supporting-shaft, a driving and coasting wheel-hub rotatably supported thereon and provided with a driver, and on its interior with a braking-surface, means for automatically clutching together said driver and hub for driving and releasing the same for coasting, a stationary fixture supported at one point by said supporting-shaft and having a radial extension engaging the vehicle-frame, a plurality of non-rotatable movable braking elements held in position by said stationary fixture, said braking elements coöperating with said braking-surface to apply a brake thereto, and means for actuating said brake by back pedaling.

7. The combination of a stationary supporting-shaft, a revoluble hub provided with an inner braking-surface, driving means arranged on said hub and braking means supported on said shaft, means for automatically clutching together said driver and hub for driving and unclutching the same for coasting, and means for producing contact between said braking means and said braking-surface of the hub for braking the latter upon back pedaling, said braking means embodying a plurality of non-rotatable braking elements movable bodily against said braking-surface of the hub and held in position by a stationary fixture supported at one point by said supporting-shaft and having a radial extension engaging the vehicle-frame.

8. The combination of a stationary supporting-shaft, a coasting wheel-hub revolubly supported thereon and provided with an inner braking-surface, a braking device embodying a plurality of independent radially-extensible braking elements applicable thereto, and held in non-rotatable position by a stationary brake element, and means for moving said extensible braking elements bodily into contact with said braking-surface of the hub by back pedaling.

9. The combination, with a coasting wheel-hub provided with an inner braking-surface, of a brake mechanism comprising a stationary fixture, a plurality of independent non-rotatable braking elements supported thereby and slightly movable relatively thereto, and means for forcing said movable elements outwardly in a radial direction against said braking-surface of the hub by back pedaling, said stationary fixture being arranged to be supported by the axle at one point and having a radial extension for engaging the vehicle-frame at another point.

10. The combination with a supporting-shaft, of a revoluble wheel-hub provided with an inner braking-surface, a brake mechanism comprising a stationary brake member supported at one point by the axle and having an extension projected radially therefrom for connection with the frame of the vehicle, a plurality of independent non-rotatable, oppositely-disposed, movable brake members connected to said stationary member, and means for forcing said movable members outwardly, by back pedaling, against said braking-surface of the hub for braking the latter.

11. The combination with a coaster wheel-hub provided with an inner braking-surface, of a brake mechanism comprising a stationary fixture, a pair of independent oppositely-disposed, radially-extensible, braking elements connected non-rotatably to said fixture, and means for forcing said elements outwardly into braking contact with said braking-surface of the hub by the backward rotation of the crank-shaft, said stationary fixture being arranged to engage the axle and having a radial extension for connection with the frame of the vehicle.

12. A clutching and braking mechanism comprising two axially-coinciding adjacent members, one of said members having an inner clutching or braking surface and the other provided with oppositely-disposed interlocked members, movable on eccentric bases, and means for forcing said interlocked members outwardly into braking or clutching contact with said inner clutching-surface of said first-named member.

13. The combination, with a wheel-hub provided with an inner braking-surface, of a brake mechanism comprising a stationary fixture provided with eccentric projections, oppositely-disposed interlocking elements mounted on said eccentrics, and means for forcing said interlocking elements outwardly against sai braking-surface of the hub.

14. A bicycle brake mechanism consisting, essentially, of a drum secured to the hub and provided with a braking-surface, a non-rotatable base-plate concentric with the supporting-shaft of said hub and provided with two annular eccentric supports surrounding the central supporting-shaft and extending in opposite directions therefrom, two segmental brake-shoes provided with annular orifices fitting around said annular eccentric supports and having their peripheral surfaces described from the center of said supporting-shaft and arranged to make braking contact at opposite surfaces of said drum, portions of said segmental brake-shoes overlapping each other, and one of said shoes engaging and controlling the movement of the other, one of said shoes also being provided with means for engaging the device controlling the operation of said brake mechanism, and means for actuating said brake mechanism.

15. A brake mechanism consisting, essentially, of two elements concentric to the same axis, one of said elements being rotatable and the other fixed relatively thereto, one of said elements having a drum provided with a flange supporting a split or elastic ring forming a slightly-yielding braking-surface and the other with movable brake-shoes or devices arranged to be brought into braking contact with said split or elastic ring, and means for actuating said brake mechanism.

16. In a bicycle-brake, the combination of the following elements: the plate or base G provided with the eccentrics $e$ $e'$ surrounding the axial center $g$ of said base and described from centers at opposite sides of said axial center, segments $f$, $f'$ mounted revolubly on said eccentrics $e, e'$, the orifices of said segments being described from centers coinciding with the centers of said eccentrics $e, e'$, and their peripheries from said axial center $g$, the drum or shell F having an axis coinciding with the axis of the said plate G, and provided with an annular flange extending over and in proximity to the peripheries of said segments $f$, $f'$ and forming a braking-surface for contact with said segments, one of said segments being provided with the projection or lug $h$ engaging an orifice or recess $h'$ in the other, one of said segments also having a lug or device H arranged to engage the device controlling the operation of said brake mechanism, and means for securing said elements operatively together.

WILLIAM ROBINSON.

Witnesses:
IDA M. LESLIE,
BARBARA BROWN.